United States Patent
Emmons

(10) Patent No.: US 9,617,922 B2
(45) Date of Patent: Apr. 11, 2017

(54) JET ENGINE ACTUATION SYSTEM

(71) Applicant: HAMILTON SUNDSTRAND CORPORATION, Charlotte, NC (US)

(72) Inventor: Floyd Richard Emmons, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 485 days.

(21) Appl. No.: 14/227,180

(22) Filed: Mar. 27, 2014

(65) Prior Publication Data
US 2015/0275770 A1    Oct. 1, 2015

(51) Int. Cl.
*F02C 9/22*     (2006.01)
*F16H 35/18*    (2006.01)
*F01D 17/16*    (2006.01)

(52) U.S. Cl.
CPC .............. *F02C 9/22* (2013.01); *F01D 17/162* (2013.01); *F16H 35/18* (2013.01); *Y10T 74/18568* (2015.01)

(58) Field of Classification Search
CPC .......... F02C 9/22; F16H 35/18; F01D 17/162; Y10T 74/18568
See application file for complete search history.

(56) References Cited

U.S. PATENT DOCUMENTS

| | | | |
|---|---|---|---|
| 2,933,235 A * | 4/1960 | Neumann | F01D 17/162 415/149.4 |
| 3,776,467 A * | 12/1973 | Riemerschmid | F02K 1/004 239/265.35 |
| 4,867,635 A * | 9/1989 | Tubbs | F04D 29/563 415/159 |
| 5,176,323 A * | 1/1993 | Nash | F02K 1/12 239/265.39 |
| 6,722,845 B2 * | 4/2004 | Chard | F01D 17/16 415/150 |
| 8,534,990 B2 * | 9/2013 | Duong | F01D 17/165 415/119 |
| 9,097,137 B2 * | 8/2015 | Suciu | F01D 17/162 |
| 9,376,933 B2 * | 6/2016 | Andersen | F01D 25/12 |
| 9,422,825 B2 * | 8/2016 | Do | F02C 9/20 |
| 2009/0104022 A1 * | 4/2009 | Suljak, Jr. | F01D 17/162 415/160 |

(Continued)

*Primary Examiner* — Thomas Denion
*Assistant Examiner* — Shafiq Mian
(74) *Attorney, Agent, or Firm* — Cantor Colburn LLP

(57) ABSTRACT

A jet engine actuation system includes a first ring gearbox, a second ring gearbox and an actuator. The first ring gearbox includes a first ring driveshaft coupled to a first portion of a synchronization ring included in a jet engine. The second ring gear box includes a second ring drive shaft coupled to a second portion of the synchronization ring. The actuator has a first actuator gearbox configured to generate a first rotational output and a second actuator gearbox configured to generate a second rotational output. A first drive shaft transfers the first rotational output to the first ring gearbox and a second drive shaft transfers the second rotational output to the second ring gearbox. The actuator simultaneously controls the first and second actuator gearboxes such that the first and second rotational outputs are simultaneously transferred to the first and second ring gearboxes to rotate the synchronization ring.

7 Claims, 4 Drawing Sheets

(56) References Cited

U.S. PATENT DOCUMENTS

| | | | |
|---|---|---|---|
| 2009/0155057 A1* | 6/2009 | Suciu | F01D 5/022 |
| | | | 415/145 |
| 2011/0110765 A1* | 5/2011 | Duong | F01D 17/165 |
| | | | 415/151 |
| 2011/0154922 A1* | 6/2011 | Matsumoto | H02K 7/116 |
| | | | 74/54 |
| 2011/0296813 A1* | 12/2011 | Frank | F02K 1/09 |
| | | | 60/230 |
| 2014/0314540 A1* | 10/2014 | Do | F02C 9/20 |
| | | | 415/1 |

* cited by examiner

ENGINE VIEWED FROM BOTTOM

ENGINE VIEWED FROM BOTTOM

JET ENGINE ACTUATION SYSTEM

STATEMENT OF FEDERAL SUPPORT

This invention was made with Government support under Contract No. N00014-09-D-0821-0006 awarded by the Navy. The Government has certain rights in the invention.

BACKGROUND OF THE INVENTION

The present invention generally relates jet engines, and more specifically, to a jet engine system including an engine actuation system.

Jet engines include various actuation systems configured to adjust the internal variable geometry of the engine. Actuators for adjusting the internal variable geometry are typically located on the engine outer case because areas in close proximity internal variable geometry reach excessive temperatures due to the high internal engine temperatures. Mechanical actuation systems typically transmitting an actuating force from the outer case to the internal geometry. To minimize distorting the internal geometry, the engine is typically adjusted at two opposing contact points located on opposite sides of the engine synchronization ring. Therefore, conventional engine actuation systems require two separate actuators. The separate actuators are operated independent from one another and generate an independent force that acts on respective contact point of the synchronization ring.

BRIEF DESCRIPTION OF THE INVENTION

According to an embodiment, a jet engine system includes an engine and an actuation system. The engine includes a synchronization ring having a ring diameter that defines an air passage and that rotates circumferentially about the air passage. The engine further includes an inner housing that supports the synchronization ring, and an outer housing disposed about the inner housing. The actuation system includes first and second ring gearboxes coupled to the inner housing and configured to rotate the synchronization ring. The actuation system further includes an actuator having a first gearbox configured to generate a first rotational output and a second actuator gearbox configured to generate a second rotational output. A first drive shaft has a first shaft end rotatably coupled to the first actuator gearbox and a second shaft end rotatably coupled to the first ring gear box. A second drive shaft has a first shaft end rotatably coupled to the second actuator gearbox and the second shaft end rotatably coupled to the second ring gear box. The actuator is configured to simultaneously control the first and second actuator gearboxes such that the first and second rotational outputs are simultaneously transferred to the first and second ring gearboxes, respectively, to circumferentially rotate the synchronization ring.

According to another embodiment, a jet engine actuation system includes a first ring gearbox, a second ring gearbox and an actuator. The first ring gearbox includes a first ring driveshaft coupled to a first portion of a synchronization ring included in a jet engine. The second ring gear box includes a second ring drive shaft coupled to a second portion of the synchronization ring. The actuator has a first actuator gearbox configured to generate a first rotational output and a second actuator gearbox configured to generate a second rotational output. A first drive shaft transfers the first rotational output to the first ring gearbox, and a second drive shaft transfers the second rotational output to the second ring gearbox. The actuator is configured to simultaneously control the first and second actuator gearboxes such that the first and second rotational outputs are simultaneously transferred to the first and second ring gearboxes to rotate the synchronization ring

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1A:
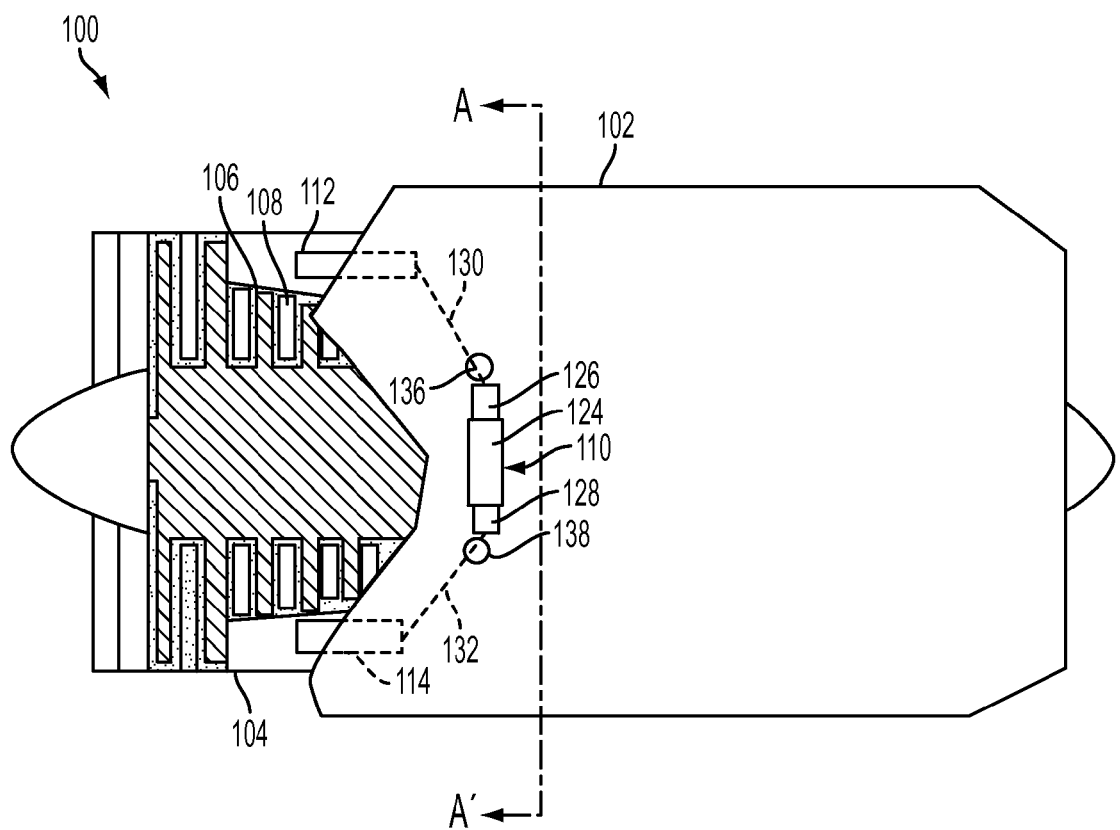
FIG. 1A is a partial cut-away view of a jet engine system viewed from the bottom according to an embodiment.
Figure 1B:
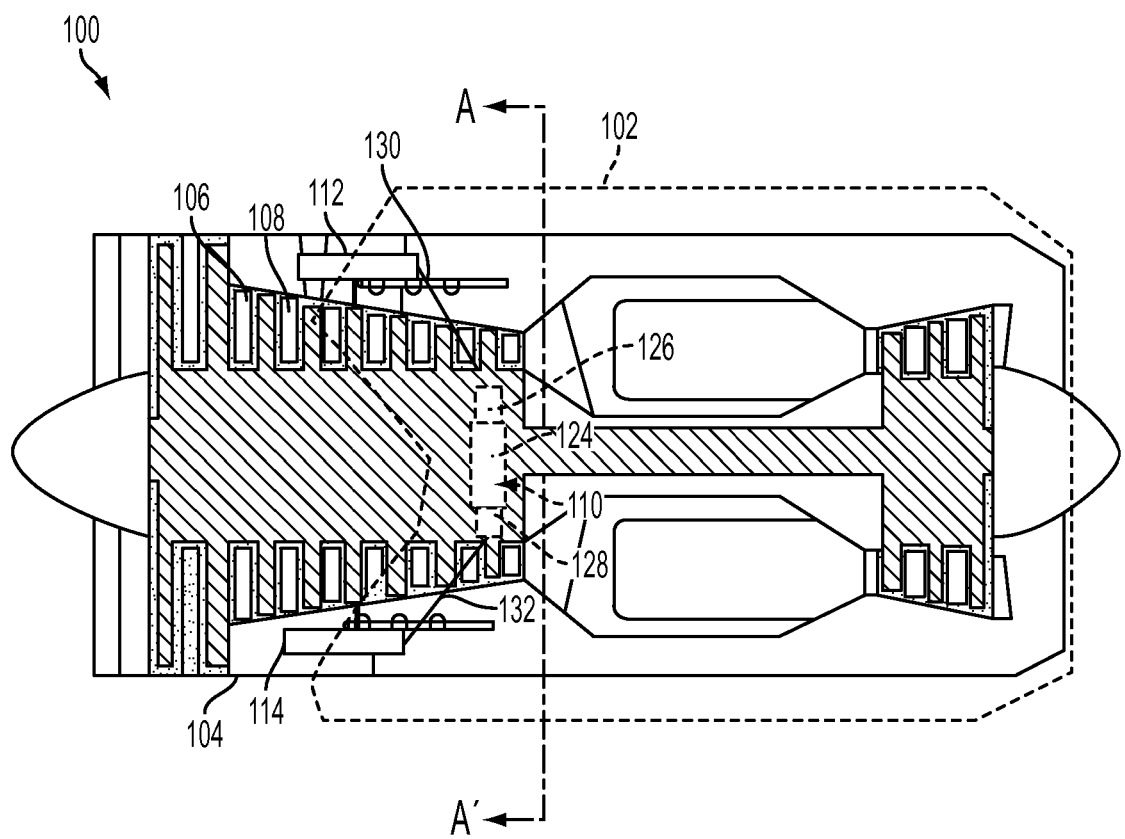
FIG. 1B illustrates the jet engine system of FIG. 1A showing the remaining internal components of the jet engine.

Referring to FIGS. 1A-1B, a jet engine system 100 is illustrated according to at least one embodiment. The jet engine system 100 includes a jet engine 101 having an outer housing 102, an inner housing 104 and a synchronization ring 106. The outer housing 102 is formed from a rigid material such as, for example, metal, and is disposed around the inner housing 104. The inner housing 104 is formed from a rigid material such as, for example, metal, and is disposed around the synchronization ring 106 (hereinafter referred to as sync ring 106). The sync ring 106 has a ring diameter ($d_R$) that defines an air passage. The sync ring 106 is configured to rotate circumferentially about the air passage as understood by one of ordinary skill in the art.

The sync ring 106 includes a plurality of stator vanes 108 rotatably coupled thereto. Each stator vane 108 extends radially from the sync ring 106 and into the air passage. The pitch of each stator vane 108 may be adjusted about their respective radial axis in response to rotating the sync ring 106. The rotation of the stator vanes 108 adjust the flow of air through air passage according to different operating conditions as understood by one of ordinary skill in the art.

Figure 2A:
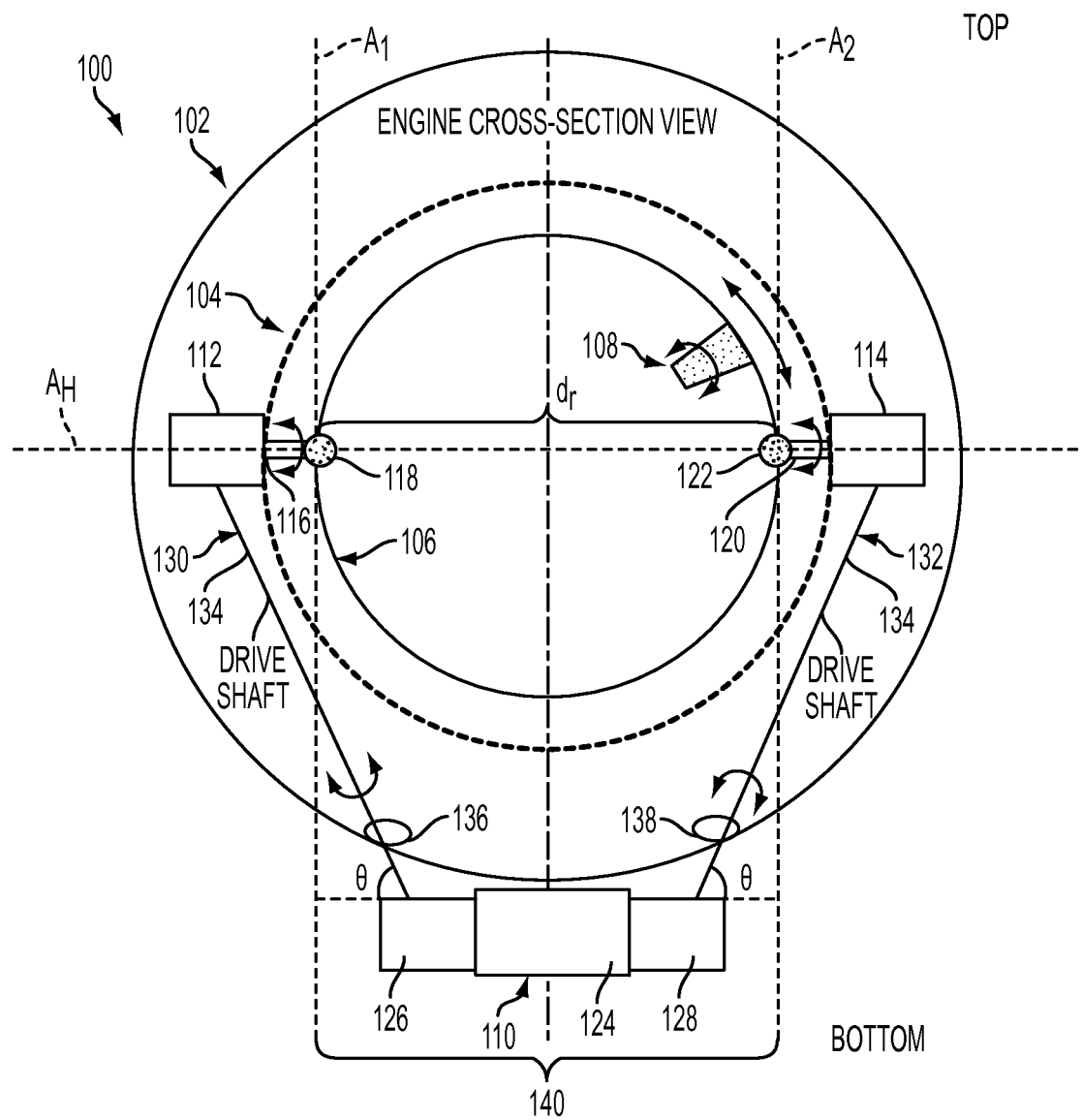
FIG. 2A is a cross-sectional view of the jet engine system illustrated in FIGS. 1A and 1B that shows an engine actuation system according to an embodiment.
Figure 2B:
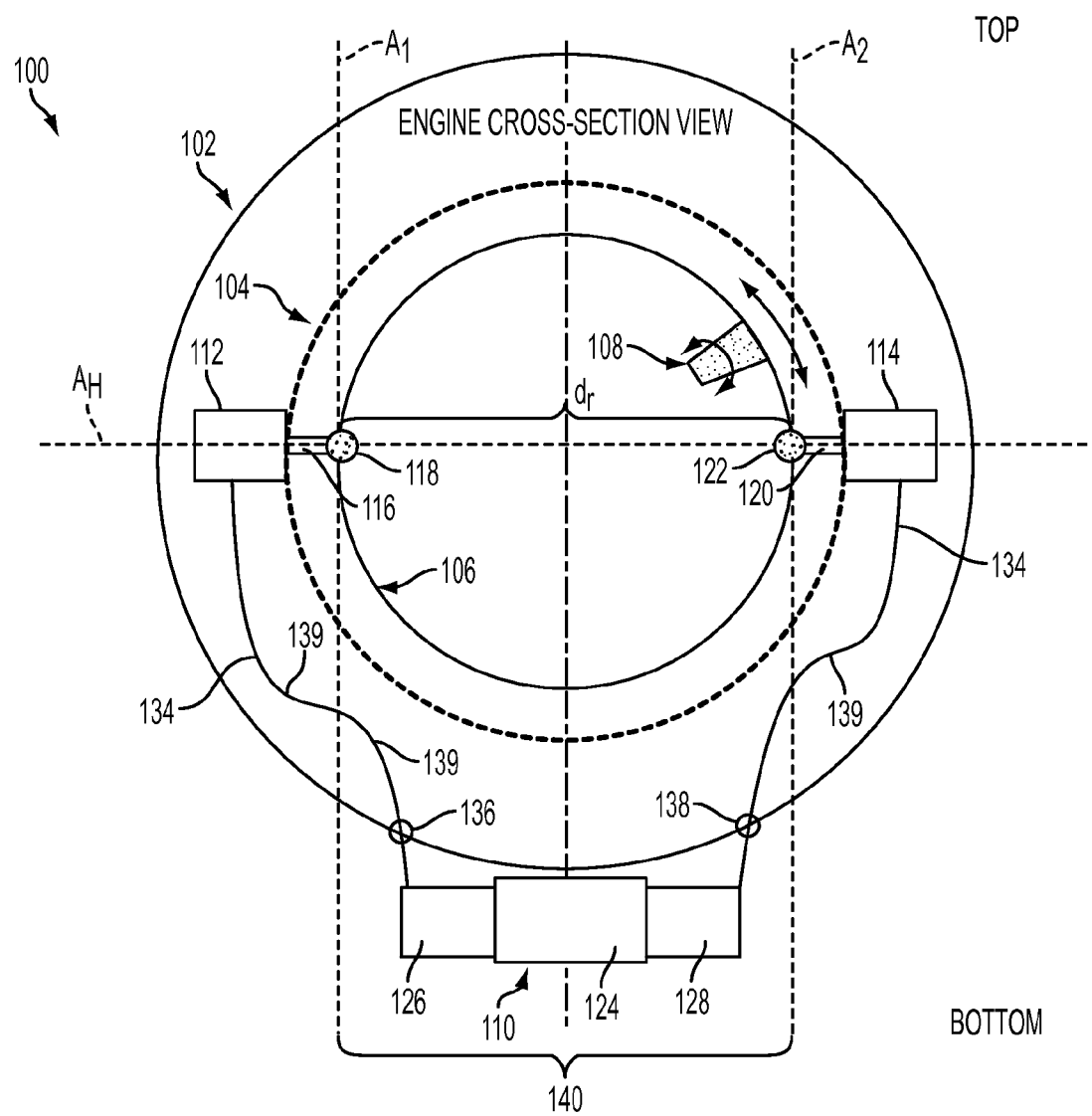
FIG. 2B is a cross-sectional view of the jet engine system illustrated in FIGS. 1A and 1B that shows an engine actuation system according to another embodiment.

Turning now to FIGS. 2A-2B, a cross-section of the engine system taken along line A-A' is illustrated. The jet engine system 100 further includes an actuation system 110. The actuation system may be configured to adjust position of compressor vanes and/or turbine vanes. The actuation system 110 includes a ring portion and an actuator portion that controls the ring portion. The ring portion includes a first ring gearbox 112 and a second gearbox 114. The first and second ring gearboxes 112, 114 are disposed along a horizontal axis ($A_H$) extending radially through the inner housing 104. The first ring gearbox 112 includes a first rotatable ring shaft 116 that extends through the inner housing 104 and is rotatably coupled to a first contact point 118 located on a first side of the sync ring 106. The second ring gearbox 114 includes a second rotatable ring shaft 120 that extends through the inner housing 104 and is rotatably coupled to a second contact point 122 located on an opposite side of the sync ring 106.

The actuator portion includes an actuator 124 having a first actuator gearbox 126 and a second actuator gearbox 128. The actuator 124 is disposed adjacent to an exterior surface of the outer housing 102 and is configured to simultaneously control the first gearbox 126 and the second actuator gearbox 128. The first actuator gear box 126 generates a first rotational output, and a second actuator gearbox 128 generates a second rotational output. The actuator portion further includes a first drive shaft 130 and a second drive shaft 132. The first drive shaft 130 has a body 134 that is disposed through a first hole 136 formed in the outer housing 102. The body 134 of the first drive shaft 130 extends between a first shaft end that is rotatably coupled to the first ring gearbox 112 and a second shaft end that is rotatably coupled to the first actuator gearbox 126. The second drive shaft 132 has a body 134 that is disposed through a second hole 138 formed in the outer housing 102. The body 134 of the second drive shaft 132 extends between a first shaft end that is rotatably coupled to the second ring gearbox 114 and a second shaft end that is rotatably coupled to the second actuator gearbox 128. The body 134 of the first and second drive shafts 130, 132 may be formed from various materials and may have various shapes for connecting the actuator 124 to each of the first and second ring gearboxes 126, 128. In this regard, the first and second rotational outputs are simultaneously transferred to the first and second ring gearboxes 112, 114 to circumferentially rotate the synchronization ring 106. According to a first embodiment, the first and second drive shafts 130, 132 are rigid. According to another embodiment, the first and second drive shafts 130, 132 are flexible.

According to at least one embodiment, a first vertical axis ($A_1$) extends through the first contact point 118 of the synchronization ring 106 and is perpendicular to the horizontal axis ($A_H$), and a second vertical axis ($A_2$) extends through the second contact point 122 of the synchronization ring 106 and is perpendicular to the horizontal axis ($A_H$). The first vertical axis 118 and the second vertical axis 122 define an exterior envelope region 140 therebetween. The exterior envelope region 140 has a length equal to the ring diameter ($d_R$). With reference to at least one embodiment shown in FIGS. 2A-2B, the actuator 124 is coupled to the exterior surface of the outer housing 102 and is disposed within the exterior envelope region 140.

Referring to an embodiment shown in FIG. 2A, the body 134 of the first and second drive shafts 130, 132 is substantially straight between the first and second ends. In this regard, each body 134 extends between a ring gearbox 112,114 and a corresponding actuator gearbox 126, 128 at an angle (θ) respective to the vertical axes ($A_1$/$A_2$) and the exterior envelope region 140. According to another embodiment shown in FIG. 2B, the body 134 of the first and second drive shafts 130, 132, includes one or more curved portions 139 formed between the first and second ends. In this regard, the body 134 of each drive shaft 130, 132 may traverse at various directions within the spacing between the outer housing 102 and the inner housing 104 in order to connect the first and second ring gearboxes 112, 114 to the respective actuator gearboxes 126, 128. As described in detail above, various embodiment of the present disclosure provide an actuation system configured to drive a sync ring at two separate points around the ring from a single actuator.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A jet engine system, comprising:
at least one engine including:
a synchronization ring configured to circumferentially rotate, wherein a first vertical axis extends through a first side of the synchronization ring, and a second vertical axis extends through a second side of the synchronization ring, the first and second vertical axes defining an exterior envelope region therebetween, the exterior envelope region having a length equal to a diameter of the synchronization ring;
an inner housing that supports the synchronization ring, and an outer housing disposed about the inner housing;
an actuation system including:
first and second ring gearboxes coupled to the inner housing and configured to rotate the synchronization ring;
an actuator having a first actuator gearbox configured to generate a first rotational output and a second actuator gearbox configured to generate a second rotational output, the actuator being disposed within the exterior envelope region and being coupled to an exterior surface of the outer housing;
a first drive shaft having a first shaft end rotatably coupled to the first actuator gearbox and a second shaft end rotatably coupled to the first ring gear box; and
a second drive shaft having a first shaft end rotatably coupled to the second actuator gearbox and the second shaft end rotatably coupled to the second ring gear box, a body of the first and second drive shafts including at least one curved portion between the first and second ends, each body extending between a respective actuator gearbox and a respective ring gearbox at an angle with respect to the exterior envelope;
wherein the actuator is configured to simultaneously control the first and second actuator gearboxes such that the first and second rotational outputs are simultaneously transferred to the first and second ring gearboxes, respectively, to circumferentially rotate the synchronization ring.

2. The jet engine system of claim 1, wherein the first and second ring gearboxes are aligned with a horizontal axis that is perpendicular to the vertical axis and that extends radially through the inner housing.

3. The jet engine system of claim 2, wherein the first ring gearbox is coupled to a first side of the inner housing and the second ring gearbox is coupled to a second side of the inner housing opposite the first side, each of the first and second gearboxes including a ring shaft extending through the inner housing and rotatably coupled to a respective portion of the synchronization ring.

4. The jet engine system of claim 3, wherein the first drive shaft has a body disposed through a first hole formed in the outer housing and extends between the first and second shaft ends, and the second drive shaft has a body disposed through a second hole formed in the outer housing and extends between the first and second shaft ends.

5. The jet engine system of claim 4, further comprising a plurality of stator vanes rotatably coupled to the synchronization ring and extending radially from the synchronization ring into an air passage, the plurality of stator vanes configured to rotate in response to rotating the synchronization ring.

6. A jet engine actuation system, comprising:
  a first ring gearbox including a first ring driveshaft coupled to a first portion of a synchronization ring included in a jet engine, wherein a first vertical axis extends through a first side of the synchronization ring, and a second vertical axis extends through a second side of the synchronization ring, the first and second vertical axes defining an exterior envelope region therebetween having a length equal to a diameter of the synchronization ring;
  a second ring gear box including a second ring drive shaft coupled to a second portion of the synchronization ring, the first and second portions located opposite from one another and aligned along a horizontal axis extending radially through the synchronization ring;
  an actuator having a first actuator gearbox configured to generate a first rotational output and a second actuator gearbox configured to generate a second rotational output, the actuator being disposed within the exterior envelope region and being coupled to an outer housing of the jet engine;
  a first drive shaft having a first end rotatably coupled to the first ring gearbox and a second end coupled the first actuator gearbox; and
  a second drive shaft having a first end rotatably coupled to the second ring gearbox and a second end coupled to the second actuator gearbox, a body of the first and second drive shafts including at least one curved portion between the first and second ends, each body extending between a respective actuator gearbox and a respective ring gearbox at an angle with respect to the exterior envelope;
  wherein the actuator is configured to simultaneously control the first and second actuator gearboxes such that the first and second rotational outputs are simultaneously transferred to the first and second ring gearboxes, respectively to circumferentially rotate the synchronization ring.

7. A jet engine system, comprising:
  at least one engine including:
    a synchronization ring configured to circumferentially rotate, wherein a first vertical axis extends through a first side of the synchronization ring, and a second vertical axis extends through a second side of the synchronization ring, the first and second vertical axes defining an exterior envelope region therebetween, the exterior envelope region having a length equal to a diameter of the synchronization ring;
    an inner housing that supports the synchronization ring, and an outer housing disposed about the inner housing;
  an actuation system including:
    first and second ring gearboxes coupled to the inner housing and configured to rotate the synchronization ring;
    an actuator having a first actuator gearbox configured to generate a first rotational output and a second actuator gearbox configured to generate a second rotational output, the actuator being disposed within the exterior envelope region and being coupled to an exterior surface of the outer housing;
    a first drive shaft having a first shaft end rotatably coupled to the first actuator gearbox and a second shaft end rotatably coupled to the first ring gear box; and
    a second drive shaft having a first shaft end rotatably coupled to the second actuator gearbox and the second shaft end rotatably coupled to the second ring gear box, a body of the first and second drive shafts extending straight between the first and second ends, each body extending between a respective actuator gearbox and a respective ring gearbox at an angle with respect to the exterior envelope;
  wherein the actuator is configured to simultaneously control the first and second actuator gearboxes such that the first and second rotational outputs are simultaneously transferred to the first and second ring gearboxes, respectively, to circumferentially rotate the synchronization ring.

* * * * *